United States Patent
Fielder (12)

(10) Patent No.: US 8,614,519 B2
(45) Date of Patent: Dec. 24, 2013

(54) ELECTRIC POWER STORAGE POWER PLANT

(76) Inventor: William Sheridan Fielder, Ojai, CA (US)

( * ) Notice: Subject to any disclaimer, the term of this patent is extended or adjusted under 35 U.S.C. 154(b) by 500 days.

(21) Appl. No.: 12/928,011

(22) Filed: Nov. 30, 2010

(65) Prior Publication Data

US 2011/0127777 A1    Jun. 2, 2011

Related U.S. Application Data

(60) Provisional application No. 61/283,365, filed on Dec. 2, 2009, provisional application No. 61/283,721, filed on Dec. 7, 2009.

(51) Int. Cl.
*H02P 9/04*    (2006.01)

(52) U.S. Cl.
USPC ........................................... 290/1 E; 290/4 R

(58) Field of Classification Search
USPC ................. 290/1 R, 4 R, 5, 1 E, 1 A
See application file for complete search history.

(56) References Cited

U.S. PATENT DOCUMENTS

| | | | |
|---|---|---|---|
| 5,512,787 A * | 4/1996 | Dederick | 290/4 R |
| 7,127,886 B2 | 10/2006 | Fielder | |
| 8,450,884 B2 * | 5/2013 | Stahlkopf et al. | 307/151 |
| 2004/0201218 A1 * | 10/2004 | Hebert | 290/1 R |
| 2010/0283258 A1 | 11/2010 | Fielder | |

* cited by examiner

*Primary Examiner* — Nicholas Ponomarenko

(57) ABSTRACT

An electric power storage power plant that utilizes an existing electric power source to capture and store electricity, and then instantly retransmit it on demand, is disclosed. An electric motor transfers rotational energy to at least one energy storage spring that rotationally connects to an electric generator via a variety of rotational energy connecting elements. Utilizing energy storage springs in this manner enables intermittent generation from renewable energy sources, such as wind and solar power, to provide base load electric power, as well as providing frequency regulation, by providing storage to the national electric power grids. Electric grid power may be utilized when the price is low, and then released and transferred to an electric generator when the price of electricity is higher. Rotational energy storage may be utilized to provide backup power for applications of all sizes. It is efficient, scalable, and deployable almost anywhere.

11 Claims, 3 Drawing Sheets

ELECTRIC POWER STORAGE POWER PLANT

CROSS-REFERENCE TO RELATED APPLICATIONS

This application claims the benefit of PPA Ser. No. 61/283,365, filed Dec. 2, 2009, and PPA Ser. No. 61/283,721, filed Dec. 7, 2009, both by the present inventor, which are incorporated by reference.

BACKGROUND

Prior Art

Current means for storing electric power, on and off the grid, include: flywheel energy storage, compressed air energy storage (CAES), pumped-storage hydroelectricity, batteries, thermal energy storage, and hydrogen. These technologies, plus fossil fuels, are utilized to compensate for the spikes in demand or ebbs in supply on the electric power grid. This strategy is known as frequency regulation.

Flywheels are a short duration solution and will shatter when the tensile strength of the flywheel is exceeded, resulting in what is known as a "flywheel explosion." Hydrogen can also explode, and must be stored at high pressure. Compressed air storage and pumped hydropower are not always possible, and fossil fuels produce greenhouse gases and other air pollutants. Batteries are expensive, not ideal for frequent discharging and recharging, and are less efficient, due to the energy lost in the form of heat. Molten salt can harden within the system if it falls in temperature below its melting point of 801 degrees Celsius.

SUMMARY

In accordance with one embodiment, an electric power storage power plant utilizes an electric motor to wind an energy storage spring.

To generate electricity, rotational energy is released from the spring and powers a rotationally connected electric generator.

This offers a means of providing base load power from intermittent renewable energy sources such as solar and wind power.

Advantages

Accordingly several advantages of one or more aspects are as follows: energy storage springs provide instant on and off operation and can operate continuously, depending on the number of springs incorporated. Potentially fewer energy storage springs are required to provide the same amount of storage as flywheels. Energy storage springs are more reliable than batteries and are better suited for environments with frequent on and off cycling, as well as environments with high operating temperatures. Energy storage springs are also highly efficient, can be deployed anywhere, and require minimal maintenance. Energy storage springs provide highly efficient, pollution free frequency regulation, unlike conventional fossil fuel-powered generators that currently provide frequency regulation for the electric power grid.

Energy storage springs store electricity when it is abundant and less expensive, and then release it at peak demand when the price for electricity is at or near its peak, enabling power plants, utility companies, and others to "buy low and sell high."

Stored rotational energy may also be used as backup power for commercial and noncommercial applications, and offers a means of providing base load power from intermittent renewable energy sources such as solar and wind power.

Other advantages of one or more aspects will be apparent from a consideration of the drawings and ensuing description.

DRAWINGS

Figures

Figure 4:
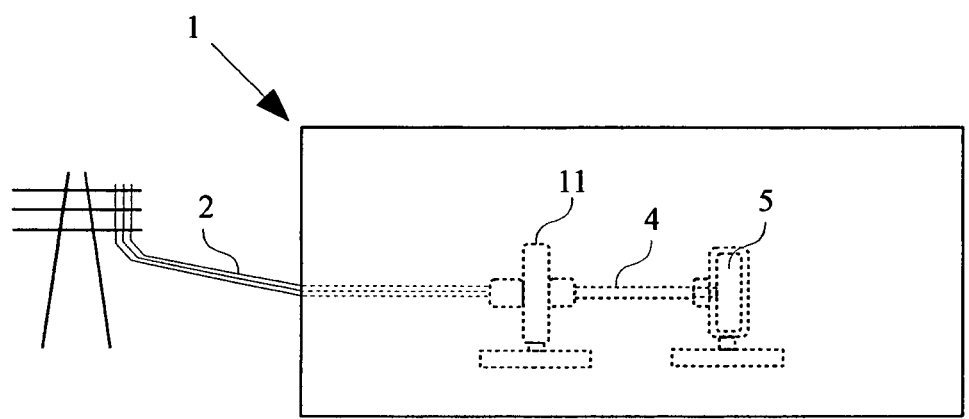

FIG. 4 portrays an electric power storage power plant that includes an all-in-one electric motor/electric generator that utilizes a rotational energy connecting element as a means of transferring rotational energy between the motor/generator and the energy storage spring.

Figure 5:
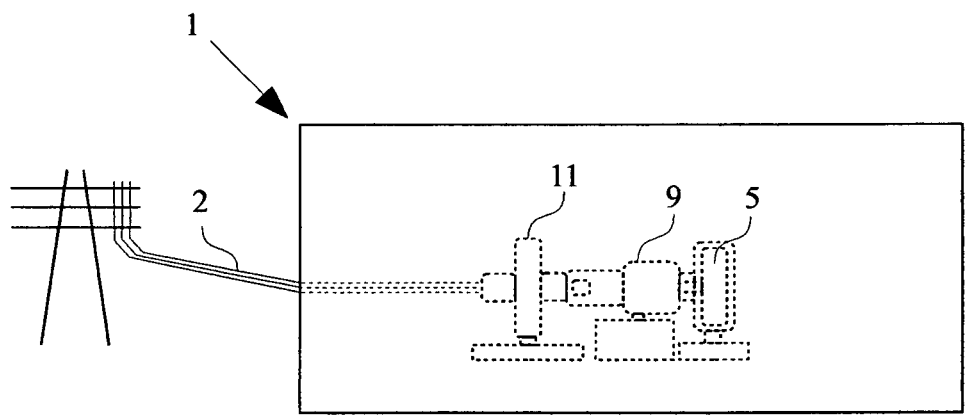

FIG. 5 shows an electric power storage power plant that includes an all-in-one electric motor/electric generator that utilizes a gear box/transmission as a means of transferring rotational energy between the motor/generator and the energy storage spring.

Figure 6:
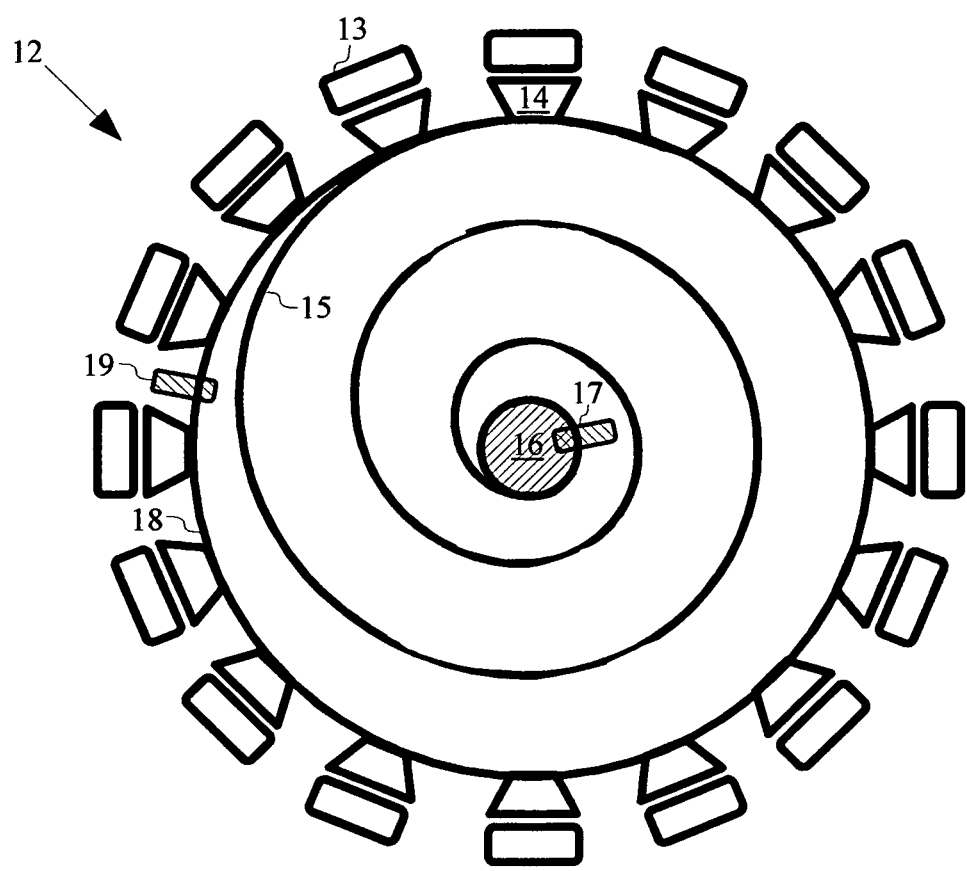

FIG. 6 depicts an all-in-one electric motor/energy storage spring/electric generator. It may also be utilized as only an all-in-one electric motor/energy storage spring.

DRAWINGS

Reference Numerals 1 electric power storage power plant
2 electric power transmission lines
3 electric motor
4 rotational energy connecting element
5 energy storage spring
6 rotational energy connecting element
7 electric generator
8 electric power transmission lines
9 gear box/transmission
10 gear box/transmission
11 all-in-one electric motor/electric generator
12 all-in-one electric motor/energy storage spring/electric generator
13 stator
14 magnet
15 energy storage spring coil
16 energy storage spring header
17 header latch
18 rotor
19 rotor latch

DETAILED DESCRIPTION

FIG. 1

Figure 1:
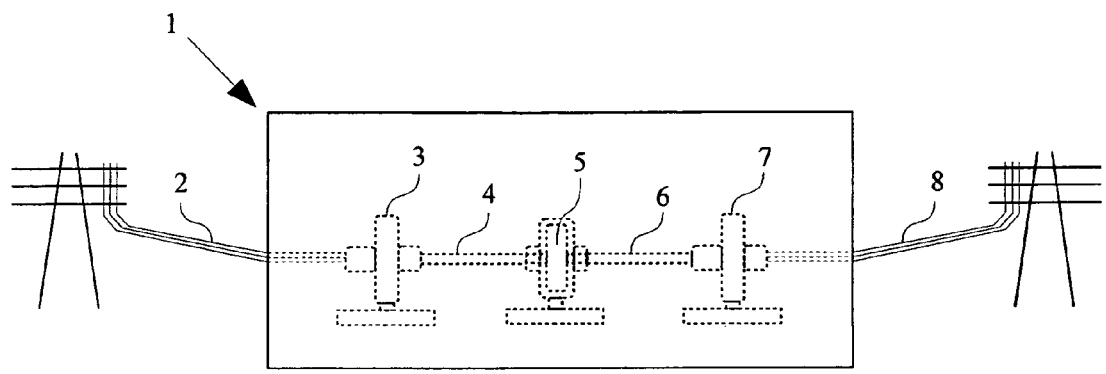
FIG. 1 illustrates an electric power storage power plant, including an electric motor, an energy storage spring, and an electric generator, to capture, store, generate, and distribute electricity; features include rotational energy connecting elements as a means of transferring rotational energy.

One embodiment of an electric power storage power plant 1 is illustrated in FIG. 1. An electric motor 3 is electrically connected to electric power transmission lines 2. An energy storage spring 5 is rotationally connected to the electric motor 3 by a rotational energy connecting element 4. An electric generator 7 is also rotationally connected to the energy storage spring 5 by a rotational energy connecting element 6. The electric generator 7 is electrically connected to electric power transmission lines 8. Referring to FIG. 6, the energy storage spring 15 is connected at the center to an energy storage spring header 16 that is also interlocked by a latch 17. The outer end of the spring 15 connects to a rotor 18 that is also interlocked by a latch 19.

Operation

With the rotor 18 secured in place by the rotor latch 19, and the energy spring header 16 free to rotate, as seen in FIG. 6, the energy storage spring 5 is brought into compression, or tension, by rotational energy transferred from the electric motor 3 by the rotational energy connecting element 4. Also, as illustrated in FIG. 6, once the spring is fully wound, movement of the energy storage spring 15 is prevented by a latch 17 that penetrates the energy storage spring's header 16.

When required, the header latch 17 is released and the spring 5 unwinds, releasing the rotational energy necessary to power the electric generator 7. The resulting electricity is transmitted by electric transmission lines 8.

Figure 2:
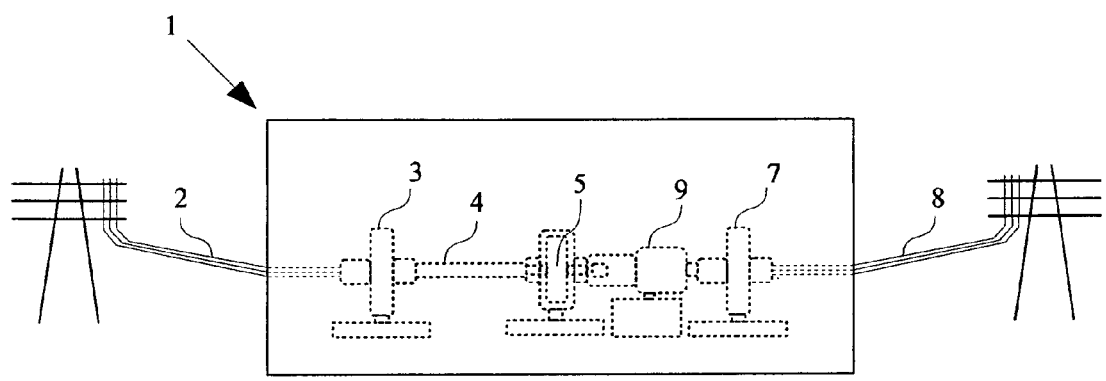
FIG. 2 depicts an electric power storage power plant that features both a rotational energy connecting element and a gear box/transmission as means of transferring rotational energy.

FIG. 2—Additional Embodiment

The electric power storage power plant 1 as seen in FIG. 2 utilizes a gear box/transmission 9, rotationally connected in between the energy storage spring 5, and the electric generator 7. A rotational energy connecting element 4 still rotationally connects the motor 3 to the energy storage spring 5.

Operation

The gear box/transmission not only transfers rotational energy, but also controls that energy.

Figure 3:
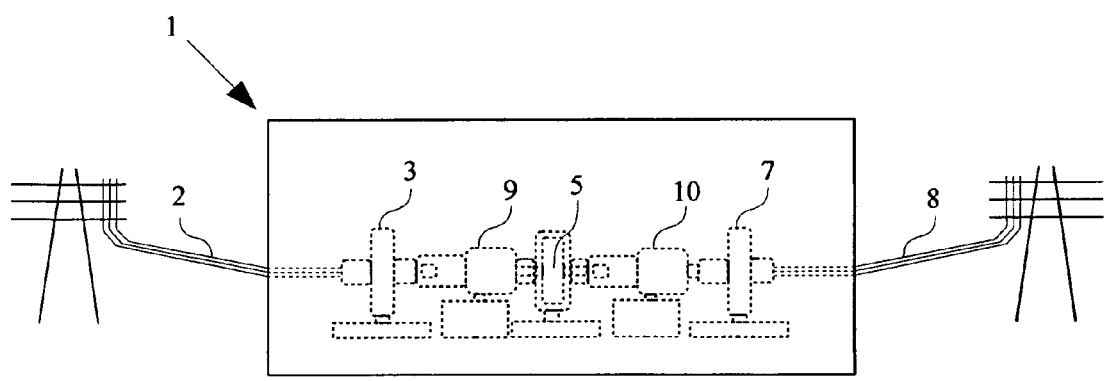
FIG. 3 represents an electric power storage power plant that features only gear box/transmissions as a means of transferring rotational energy.

FIG. 3—Additional Embodiment

FIG. 3 illustrates the use of two gear box/transmissions 9, 10 as the only means of transferring and controlling rotational energy from the electric motor 3 to the energy storage spring 5, and from the energy storage spring 5 to the electric generator 7.

FIG. 4—Additional Embodiment

In FIG. 4 an electric power storage power plant 1 incorporates an all-in-one electric motor/electric generator 11 that is electrically connected to electric transmission lines 2. The electric motor/electric generator 11 is rotationally connected to an energy storage spring 5 by a rotational energy connecting element 4.

Operation

The all-in-one electric motor/electric generator 11 operates the same as the separate electric motor 3 and electric generator 7 do, as depicted in the first embodiment. The energy storage spring 5 is brought into compression, or tension (wound), by the rotational energy that is transferred by the rotational energy connecting element 4, from the electric motor/generator 11. A latch 17, depicted in FIG. 6., prevents the spring 15 from unwinding, once wound.

Generating electricity is accomplished by releasing the header latch 17. The released rotational energy is then transferred to the electric motor/generator 11 by the same rotational energy connecting element 4 used to wind the spring. The resulting electricity is transmitted by electric transmission lines 2.

FIG. 5—Additional Embodiment

FIG. 5 also illustrates an electric power storage power plant 1 that incorporates an all-in-one electric motor/electric generator 11, but in this embodiment a gear box/transmission 9, is the exclusive means of transferring and controlling rotational energy to and from the energy storage spring 5.

FIG. 6—Additional Embodiment

FIG. 6 depicts an all-in-one electric motor/energy storage spring/electric generator 12. It may also be utilized as only an all-in-one electric motor/energy storage spring, depending upon how it is configured. Stators 13 are positioned in close proximity around a rotor 18. Magnets 14 are attached to the outer surface of the rotor 18. Attached to the inner surface of the rotor 18 is one end of an energy storage spring coil 15 that also attaches to the energy storage spring header 16. A latch 19 interlocks with the outer surface of the rotor 18. Another latch 17 interlocks with the energy storage spring header 16.

Operation

Electricity induces rotating magnetic fields by energizing the stators 13 around the rotor 18. The rotating magnetic fields interact with the magnets 14 and cause the rotor 18 to rotate, applying compression or tension to the attached energy storage spring coil 15. A latch 19 is incorporated into the rotor 18 to prevent it from moving, once the spring 15 is fully wound. When electricity is needed the latch 19 is released and the rotor 18 rotates and induces an electric current in the stators 13 that are connected to an electric power transmission means.

ADVANTAGES

From the previous description, a number of advantages of some embodiments of my apparatus become evident:
(a) Instant on and off operation.
(b) Ideal for the frequent discharging and recharging cycles that occur from main power supply problems.
(c) Provides frequency regulation to the electric power grids.
(d) Enables renewable power technologies, such as wind and solar power, to compete for base load power contracts.
(e) Enables power plants to produce and store electricity when they please, and sell it when both the demand for and the price for electricity is high.
(f) Enables utility companies, and others, to purchase and store electricity when the price is low, and sell it when the price is high.
(g) It is highly scalable and ideal for micro power application.
(h) It produces no negative environmental impact.

CONCLUSION, RAMIFICATIONS, AND SCOPE

Accordingly, the reader will see that the electric storage means of the various embodiments can be used to store as much electricity as is necessary to provide frequency regulation to the electric power grids. In addition, the embodiments described above will enable intermittent renewable energy sources, such as wind and solar power, to integrate with the national electric power grids. Furthermore, the apparatus has additional advantages in that:
  it is capable of instant on and off operation;
  it is also capable of the frequent charging and discharging that is associated with providing backup power for applications that frequently suffer from main power supply interruption;
  it is highly scalable;
  it is capable of providing base load power;
  it is deployable anywhere;
  it is capable of providing backup power for any application, such as eliminating the need for batteries, as used in uninterruptible power supplies (UPS);
  it may include the same electric transmission means for both consumption and distribution;

it may be used to purchase and store electricity when the demand or price is low, and sell it when the demand or price is higher;

it may incorporate springs fabricated from carbon nanotubes that can store up to 1,000 times the energy of steel springs;

springs may be fabricated from memory metal;

it may include a means of heating the springs before applying rotational energy; whereby requiring less energy to wind the energy storage spring, and later releasing it when the spring has cooled; whereby extending the life cycles of the mechanical parts affected;

it may further include a means of trapping the heat generated in the motors, generators, and bearings, and then using it to heat the spring; said means may include heat exchangers; it may also utilize an external source of heat;

it may incorporate gear box/transmissions calibrated to generate rotational energy at 60 revolutions per minute, or at multiples of 60; 50 revolutions per minute is appropriate for overseas installations;

it may have a means of connecting multiple electric generators of varying sizes to extend the operating time of a wound spring;

it may also include at least one buoyancy means, as described in the patent Buoyant Rotor (U.S. Pat. No. 7,348,686 B2) to increase the efficiency of the apparatus's rotors;

it can take advantage of "smart grid" technologies, allowing consumers to sell their excess electric power to their local utility companies;

it may further include a braking means for the rotors.

Although the description above contains many specificities, these should not be construed as limiting the scope of the embodiments, but as merely providing illustrations of some of several embodiments. For example, it may also include at least one buoyancy means, as described in the patent Buoyant Rotor (U.S. Pat. No. 7,348,686 B2), that will enhance the efficiency of the system's rotors.

Thus the scope of the embodiments should be determined by the appended claims and their legal equivalents, rather than by the examples given.

I claim:

1. An electric power storage power plant comprising:
at least one source of electricity;
at least one electric motor electrically connected to said at least one source of electricity;
at least one energy storage spring rotationally connected to said at least one electric motor;
at least one electric generator rotationally connected to said at least one energy storage spring;
at least one electric transmission means electrically connected to said at least one electric generator;
whereby providing a means of capturing, storing, and generating electricity;
whereby enabling utility companies, and others, to purchase and store electricity when the price is low, and sell it when the price is high;
whereby providing a means of effectively providing frequency regulation to an electric power grid;
whereby enabling intermittent renewable energy sources, such as wind and solar power, to provide base load electric power;
whereby providing a means of generating electricity for extended periods of time without interruption.

2. The electric power storage power plant, as claimed in claim 1, further includes at least one means of preventing said at least one energy storage spring from discharging rotational energy, once it is wound; wherein said means is at least one latch.

3. The electric power storage power plant, as claimed in claim 1, wherein said at least one source of electricity is one of the national electric power grids.

4. The electric power storage power plant, as claimed in claim 1, wherein said at least one electric motor is a three-phase alternating current electric motor.

5. The electric power storage power plant, as claimed in claim 1, wherein said at least one electric motor and said at least one electric generator is at least one all-in-one electric motor/generator; whereby reducing the amount of physical space required for the apparatus.

6. The electric power storage power plant, as claimed in claim 1, further includes at least one rotational energy connecting element to transfer rotational energy from said at least one electric motor to said at least one energy storage spring.

7. The electric power storage power plant, as claimed in claim 6, wherein said at least one rotational energy connecting element is a gear box/transmission.

8. The electric power storage power plant, as claimed in claim 1, further includes at least one rotational energy connecting element to transfer rotational energy from said at least one energy storage spring to said at least one electric generator.

9. The electric power storage power plant, as claimed in claim 8, wherein said at least one rotational energy connecting element is a gear box/transmission.

10. The electric power storage power plant, as claimed in claim 1, wherein said at least one electric transmission means is an electric transmission line.

11. A method to capture, store, and generate electricity comprising:
providing at least one source of electricity;
providing at least one electric motor electrically connecting to said at least one source of electricity;
providing at least one energy storage spring rotationally connecting to said at least electric motor;
providing at least one electric generator rotationally connecting to said at least one energy storage spring;
providing at least one means for transmitting the resulting electricity from said at least one electric generator to at least one electric transmission means;
whereby providing a means of capturing, storing, and generating electricity;
whereby enabling utility companies, and others, to purchase and store electricity when the price is low, and sell it when the price is high;
whereby providing a means of effectively providing frequency regulation to an electric power grid;
whereby enabling intermittent renewable energy sources, such as wind and solar power, to provide base load electric power;
whereby providing a means of generating electricity for extended periods of time without interruption.

* * * * *